United States Patent [19]
Goldstein et al.

[11] Patent Number: 5,972,411
[45] Date of Patent: Oct. 26, 1999

[54] METHODS OF MAKING AND USING PURIFIED KETTLE HOP FLAVORANTS

[75] Inventors: Henry Goldstein; Patrick L. Ting, both of Brookfield; William G. Schulze, Waukesha; Aki A. Murakami, Mequon; Lance T. Lusk, Milwaukee; Velta D. Young, New Berlin, all of Wis.

[73] Assignee: Miller Brewing Company, Milwaukee, Wis.

[21] Appl. No.: 08/838,217

[22] Filed: Apr. 3, 1997

[51] Int. Cl.$^6$ .............................. C12C 3/00; C12C 3/10
[52] U.S. Cl. ................................................ 426/600
[58] Field of Search .............................................. 426/600

[56] References Cited

U.S. PATENT DOCUMENTS

| | | |
|---|---|---|
| 1,464,520 | 8/1923 | Von Horst . |
| 2,824,803 | 2/1958 | Stark ........................................ 426/16 |
| 5,120,557 | 6/1992 | Owades . |

FOREIGN PATENT DOCUMENTS

| | | |
|---|---|---|
| 753555 | 12/1970 | Belgium . |
| 1601112 | 10/1990 | U.S.S.R. . |
| 6243 | of 1885 | United Kingdom . |

OTHER PUBLICATIONS

N.A. Abbott, et al., "The Contribution of Hydrolyzed Flavor Precursors to Quality Differences in Shiraz Juice and Wines: An Investigation by Sensory Descriptive Analysis", *Am. J. Enol. Vitic.* 42(3) 167–174, 1991.

J. Barnett, "The Utilization of Disaccharides and Some Other Sugars by Yeasts", *Advances in Carbohydrate Chemistry and Biochemistry* 39:347–404, 1981.

A. Forster, et al., "Investigations on Hop Polyphenols", Hopfenextraktion HVG Barth, Raiser & Co., Auenstrasse 18–20, 25th EPC Congress, Brussels, 1995.

L. Francis, et al., "Sensory Descriptive Analysis of the Aroma of Hydrolysed Precursor Fractions from Semillon, Chardonnay and Sauvignon Blanc Grape Juices", *J. Sci. Food Agric.* 59:511–520, 1992.

T. Fujita, et al., "Perilloside A, A Monoterpene Glucoside From *Perilla–Fruitescens*", *Photochemistry* 31(9):3265–3267, 1992.

(List continued on next page.)

*Primary Examiner*—Curtis E. Sherrer
*Attorney, Agent, or Firm*—Quarles & Brady LLP

[57] ABSTRACT

The isolation and characterization of a group of odorless and non-volatile glycosides from extracted hops (hop solids which have been previously extracted with non-polar solvents) is disclosed. These glycosides are water soluble and consist of a group of aromatic compounds conjugated to mono-, di-, and trisaccharides. These glycosides are responsible for the formation of kettle hop flavor and taste through both chemical and biological transformations. When these glycosides are transformed, they yield an essence and flavorant which imparts a kettle hop flavor and taste when the essence and flavorant is added to an unhopped beer. These kettle hop flavor essences and flavorants provide economy, consistency, flexibility, quality, and convenience to the brewing process because only one unhopped wort is required to brew a stock of unhopped beer. The unhopped beer can then be dosed with the desired amount of kettle hop flavor essence and flavorant.

46 Claims, 4 Drawing Sheets

OTHER PUBLICATIONS

Y. Fukuoka & M. Kowaka, "Identification of Compounds Imparting Hoppy Flavor to Beer", *Rep. Res. Lab. Kirin Brew. Co.* 26:31–36, 1983.

Y. Gueguen, et al., "A Very Efficient β–Glucosidase Catalyst for the Hydrolysis of Flavor Precursors of Wines and Fruit Juices", *J. Agric. Food Chem.* 44:2336–2340, 1996.

J.G. Guzinski, "Hop Oils", *The New Brewer* pp. 19–21, Jul.–Aug. 1989.

A.J. Irwin, "The Role of Oxygenated Monoterpenes in Kettle Hop Flavor", *Proc. Conv. Inst. Brew.* 20:99–104, 1988.

V.A. Marinos, et al., "Glucosides of Ethyl Indole–3–lactate and Uroterpenol in Riesling Wine", *Phytochemistry* 31(8):2755–2759, 1992.

E.M. Martinelli, "Gas–liquid chromatographic and mass spectrometric behaviour of plant glycosides, in the form of trimethylsilyl derivatives", *Eur. J. Mass. Spect. Biochem. Med. & Env. Res.* 1(1):33–43, 1980.

I. McMurrough, "High–performance Liquid Chromatography of Flavonoids in Barley and Hops", Elsevier Scientific Publishing Company, Amsterdam, pp. 683–693, 1981.

I. McMurrough & J.A. Delcour, "Wort Polyphenols", *Ferment.* 7(3):175–182, 1994.

L. Narziss, et al., "Routinemässige Bestimmung von Hopfenölen in Hopfen und Hopfenprodukten soview in Würze und Bier", *Heft* 8:324–330, 1985.

L. Narziss, et al., "Hopfenölverbindungen und ihr Beitrag zum Hopfenaroma im Bier", *Heft* 10:406–409, 1985.

V. Peacock & M. Deinzer, "Non–bitter Hop Contributions to Beer Flavor", *ACS Symp. Ser.* 170:119–127, 1981.

G. Seeleitner, et al., "Ein Fortschritt in der Hopfenölanalytik", *Heft* 9:367–371, 1985.

L. Narziss, et al., "Das Verhalten einiger Hopfenaromastoffe während der Würzekochung in Abhängigkeit technologischer Massnahman", *Heft* 11:448–454, 1985.

R. Tressl, et al., "Gas Chromatographic–Mass Spectrometric Investigation of Hop Aroma Constituents in Beer", *J. Agric. Food Chem.* 26(6):1422–1425, 1978.

J.E.A. Van Gheluwe, et al., "Hop and Malt Phenolics in Lager Brewing", *J. Inst. Brew.* 85:23–25, 1979.

S.G. Voirin, et al., "Analytical methods for monoterpene glycosides in grape and wine, I. XAD–2 extraction and gas chromatographic–mass spectrometric determination of synthetic glycosides", *J. Chrom.* 590:313–328, 1992.

S.G. Voirin, et al., "Analytical methods for monoterpene glycosides in grape and wine, II. Qualitative and quantitative determination of monoterpene glycosides in grape", *J. Chrom.* 595:269–281, 1992.

P.J. Williams, et al., "Hydrolytic Flavor Release from Non–Volatile Precursors in Fruits, Wines and Some Other Plant–Derived Foods", In *Recent Dev. Flav. Frag. Chem.*, R. Hopp, et al., Eds., pp. 283–290, 1993.

P. Winterhalter, "Oxygenated $C_{13}$–Norisoprenoids, Important Flavor Precursors", Chapter 9. In *Flavor Precursors, ACS Symposium,* pp. 98–115, 1992.

METHODS OF MAKING AND USING PURIFIED KETTLE HOP FLAVORANTS

CROSS REFERENCE TO RELATED APPLICATIONS

Not applicable.

STATEMENT REGARDING FEDERALLY SPONSORED RESEARCH

Not applicable.

BACKGROUND OF THE INVENTION

1. Field of the Invention

The present invention relates to post-fermentation kettle hop essences and flavorants, and methods of making and using them. More particularly, it relates to glycosides which are capable of imparting kettle hop essence and flavor (e.g., aroma and taste) to malt beverages.

2. Background of the Art

Hops in brewing mainly add bitterness and impart a hop flavor (e.g., taste and smell) in the final product. Hops are composed of soft resins, hard resins, hop oils, waxes, lipids, and carbohydrates. The soft resins consist of $\alpha$-acids and $\beta$-acids. The soft resins and a hop oil fraction are extractable by organic solvents, or by liquid and supercritical $CO_2$. In conventional brewing, the $\alpha$-acids are converted into iso-$\alpha$-acids which are responsible for the bitterness taste. However, as the character of hop flavor is concerned, its description in beer is subjected to a great deal of debate, but all agree that the hop flavor (or the kettle hop flavor) is an essential part in the total organoleptic impact of beer.

When hops, hop extracts, or a hop oil fraction undergo boiling in wort, the hop oils (terpene and sesquiterpene hydrocarbons) are lost mostly through volatilization. As a result, these hydrocarbons are not found in most beers in significant amounts and therefore are not responsible for kettle hop flavor (V. Peacock and M. Deinzer, *ACS Symp. Series* 170:119–127, 1981). The surviving hop oil components include some oxidized hop oil compounds in very small quantities. We and other investigators have found that these oxidized compounds have very little effect on the kettle hop flavor (J. Irwin, *Proc. Conv. Inst. Brew* 20:99–104, 1988; Y. Fukuoka and M. Kowaka, *Rep. Res. Lab. Kirin Brew. Co.* 26:31–36, 1983).

Hops or a hop oil fraction have often been added after fermentation to maintain such volatile hydrocarbon flavors. This practice is called "dry hopping" (J. G. Guzinski, *The New Brewer* pp. 19–21, July–August 1989; L. Narziβ, et al., *Monatsschrift fur Brauwissenschaft* 38(10):406–409, 1985). But these hop flavors are not considered to be a true and delicate "kettle hop flavor". In the past, attempts have been made to separate hop oil components into various fractions with the purpose of adding these fractions to unhopped beer in order to achieve kettle hop flavor in the products thus produced. These attempts have all met with failure. We believe that the true "kettle hop flavor" refers to the flavor derived from other hop components either intact or modified during fermentation and not to these volatile or oxygenated hydrocarbons.

Heretofore, the brewer produces a different hopped wort stream for each finished beer product having the desired kettle hop flavor characteristics. This entails using dedicated equipment for each such wort stream. Thus, the brewer is faced with many production, quality control, and financial considerations especially when many different products must be produced.

Understanding the chemistry of kettle hop flavor would have a striking impact on the brewing process for quality and for economy. Our previous work utilizing the hop solids (the residue left when hops are extracted by either liquid/supercritical $CO_2$ or non-polar organic solvents), or water extracts of hop solids, to achieve a kettle hop flavor in beer convinced us to investigate their composition and transformation. Our approach is different from that of the prior art by not focusing on the components in the volatilized hop oils or a hop oil fraction, but concentrating on the water soluble substances in hops or those water soluble substances remaining in the hop solids.

Thus, a need exists for understanding the chemistry of kettle hop flavor components. Such an understanding would allow the brewer to construct a kettle hop flavor essence which could then be added to an unhopped beer stream to obtain a beer with the desired degree of kettle hop flavoring.

BRIEF SUMMARY OF THE INVENTION

We have discovered a new class of kettle hop flavor essences and flavorants which, surprisingly, can be added to an unhopped beer stream to achieve economy, flexibility, consistency, and quality to the brewing process.

One aspect of the invention provides a method of making a purified kettle hop essence and flavorant, comprising: extracting hops with an aqueous alcohol to produce an extract containing polar, water soluble compounds; concentrating the extract with respect to the polar, water soluble compounds; and purifying the concentrated extract with respect to kettle hop essences and flavorants to produce the purified kettle hop essence and flavorant. Preferably, the ratio of hops to aqueous alcohol is 1:1 to 1:100 w/v and the hops are hop solids. It is also preferred that the aqueous alcohol contains 0.1% to 100% v/v water and that the alcohol is ethanol. Preferably, the concentrating step is accomplished by evaporation.

The purifying step is preferably accomplished by the steps of (a) feeding the extract to a liquid chromatography column having a packing material selected from the group consisting of polymeric resins, activated carbon, molecular sieves, silica gels, derivatized silica gels, celluloses, and derivatized celluloses whereby kettle hop essences and flavorants are retained on the packing material; (b) eluting the kettle hop essences and flavorants from the packing material to obtain an eluent containing the compounds; and (c) further concentrating the compounds in the eluent by evaporation.

The purifying step can also be accomplished by the steps of (a) feeding the extract to a membrane process selected from the group consisting of filtration, reverse osmosis, ultrafiltration, size-exclusion, dialysis, electro-dialysis, and osmosis whereby the kettle hop essences and flavorants are retained in a retentate and (b) further concentrating the compounds in the retentate by evaporation.

It is especially advantageous if the above purification steps are directed to the removal of at least a portion of the free carbohydrates and inorganic salts from the extract.

Another aspect of the invention provides adding at least one hop fraction selected from the group consisting of hop oil, iso-$\alpha$-acids, dihydroiso-$\alpha$-acids, tetrahydroiso-$\alpha$-acids, and hexahydroiso-$\alpha$-acids to the above purified kettle hop essence and flavorant.

It is advantageous that the kettle hop essences and flavorants are glycosides and that at least some of the glycosides are converted to aglycones by breaking the attachment of the sugar moiety to the aglycone. Such a converting step in the above methods can be accomplished in the presence of enzymes which are selected for their ability to break the attachment of the sugar moiety to the aglycone. Conversion can also be accomplished by fermentation in the presence of yeast and model wort; by fermentation in the presence of yeast and wort; or by acid hydrolysis.

A further aspect of the invention provides a kettle hop essence and flavorant comprising a purified aqueous lower alcohol extract of hops which has been purified with respect to kettle hop essences and flavorants. Preferably, the hops are hop solids, and the kettle hop essences and flavorants are glycosides. It is also advantageous that the essence and flavorant further comprises at least one hop fraction selected from the group consisting of hop oil, iso-$\alpha$-acids, dihydroiso-$\alpha$-acids, tetrahydroiso-$\alpha$-acids, and hexahydroiso-$\alpha$-acids.

A still further aspect of the invention provides a kettle hop essence and flavorant comprising a purified and converted aqueous alcohol extract of hops which has been purified with respect to glycosides and then at least partially converted by breaking the attachment of the sugar moiety to the aglycone molecule. Preferably, the hops are hop solids, and the essence and flavorant further comprises at least one hop fraction selected from the group consisting of hop oil, iso-$\alpha$-acids, dihydroiso-$\alpha$-acids, tetrahydroiso-$\alpha$-acids, and hexahydroiso-$\alpha$-acids.

Another aspect of the invention provides a method of making kettle hop flavored beverages from a fermentable growth media comprising the steps of: fermenting the media; and adding to the fermented media the essence and flavorant of the above kind to form the kettle hop flavored beverage. The method can include the further step of adding at least one hop fraction selected from the group consisting of hop oil, iso-$\alpha$-acids, dihydroiso-$\alpha$-acids, tetrahydroiso-$\alpha$-acids, and hexahydroiso-$\alpha$-acids.

Yet another aspect of the invention provides a method of making a kettle hop flavored beverage from a fermentable growth media comprising the steps of: adding to the media, prior to fermentation, the essence and flavorant; and fermenting the media to form the kettle hop flavored beverage. The method can include the further step of adding at least one hop fraction selected from the group consisting of hop oil, iso-$\alpha$-acids, dihydroiso-$\alpha$-acids, tetrahydroiso-$\alpha$-acids, and hexahydroiso-$\alpha$-acids.

Another aspect of the invention provides a kettle hop flavored beverage prepared by methods of the above kind.

A still further aspect of the invention provides a kettle hop essence and flavorant comprising: linalool, $\alpha$-terpineol, ipsdienol, and geraniol, or precursors, or derivatives thereof. Preferably, the essence and flavorant is synthetically produced and substantially pure.

The objects of the invention, therefore, include providing kettle hop flavor essences (and methods of making and using them):

(a) which can be added directly to unhopped beer to impart a kettle hop flavor to the beer similar to conventional processes using whole hops or hop pellets in the kettle boil;

(b) which produce a light-stable beer product;

(c) which provide economy, efficiency, consistency, flexibility, convenience, and quality to the brewing process; and (d) which increase capacity and flexibility with respect to brewhouse operations and the use of fermentation and aging tanks in the brewing process.

These and still other objects and advantages of the present invention will be apparent from the description below.

However, this description is only of the preferred embodiments. The claims should, therefore, be looked to in order to assess the whole scope of the invention.

DETAILED DESCRIPTION OF THE INVENTION

By hop solids we mean whole hops or hop pellets which have been previously extracted with a non-polar inorganic or organic solvent such as carbon dioxide (liquid or supercritical) or hexane. By "essence" we mean compounds which can be perceived as smell, and by "flavorant" we mean compounds which can be perceived by taste.

When Cascade hop solids or, a water extract thereof, is added to the boiling wort, our experience shows that it imparts a kettle hop flavor after fermentation similar to the flavor imparted by the addition of whole hops or hop pellets. We describe this kettle hop flavor as having a hoppy, citrus, pineapple, spicy, grassy, and/or grapefruit flavor as well as an unique pleasant taste and mouthfeel. Two criteria which we unexpectedly discovered to be important for the formation of this flavor are the water soluble substances in hops and the subsequent fermentation products of these water soluble substances. These became the targets of our investigation.

In plants, various glycosides (a class of complex carbohydrates) are stored for particular function and purpose. Glycosides or glycoconjugates are composed of various organic compounds in conjunction with monosaccharides (mostly glucose), disaccharides, trisaccharides and etc. These organic parts of the molecules (called aglycones) can be freed by biological or chemical reactions. Some molecules (aglycones) have aromatic potential. Many flavor characteristics of fruits are due to the presence of these glycosides.

We surprisingly discovered that these water soluble substances consist of glycosides and are present in hops. The situation may be similar to that of grapes in wine-making in which the aromatic compounds are present in the berry either in a free state or bound to sugars in the form of glycosides.

Although some glycosylated polyphenols or flavonols have been isolated and identified, their contribution to hop flavor in beer has been rejected (I. McMurrough and J. A. Delcour, "Wort Polyphenols", *Ferment*, Vol. 7, No. 3, 1994, pp. 175–282; J. E. A. Van Gheluwe, et al., *J. Inst. Brew.* 85:23–25; A. Forster, et al., "Investigations on Hop Polyphenols", *The 25th EBC Congress*, Brussels, 1995; I. McMurrough, "High-Performance Liquid Chromatography of Flavonoids in Barley and Hops", pp. 681–693, 1981 Elsevier Scientific Publishing Company). We recognize that kettle hop flavor is probably not due to a sole compound, but a mixture of aromatic and non-aromatic substances. Each compound has its own threshold level in beer. Because we are dealing with multiple glycosides in low concentrations, chemical analysis is very difficult. Our approaches to the problem are a combination of concentration and fractionation, sensorial and chemical analyses, direct analysis of glycosides and indirect analysis of the counterparts (volatile aglycone molecules and carbohydrates) of glycosides.

To complement chemical analysis, a routine sensorial analysis was used for identifying the kettle hop flavor in an established fermentation system which consisted of a simple sugar, selected hop components, yeast, inorganic salts and water. Sugars were used instead of real wort to simplify the system.

Extraction

Hop solids render a simpler and cleaner feed material than hops for a subsequent extraction with polar solvents. Pre-extraction with liquid/supercritical $CO_2$ removes the valuable hop soft resin ($\alpha$-acids and $\beta$-acids), a hop oil fraction and waxes from hops. It leaves a cellulose material containing about 25% w/w of water soluble substances. After a hot water extraction, filtration, and then evaporation, an extract was obtained. However, when methanol (or ethanol) was used as the co-solvent, it facilitated the filtration process and reduced the extraction temperature to room temperature, but an extra effort is required (using centrifugation) to remove the methanol soluble hop hard resin. Other lower alkanols ($C_1$–$C_6$) can also be used, but ethanol is preferable for food use.

We found that only extracts using water or other polar solvents such as an alcohol-water mixture contributed the kettle hop flavor to the fermentation product. Preferably, an aqueous alcohol mixture is used to extract the hops or hop solids. Any ratio of an aqueous alcohol mixture can be used to extract the water soluble substances in hops, but a range of 20–80% (v/v) alcohol in water is most desirable.

Four major polyphenols (also known as flavonoids or flavonols) are present in the extract as glycosides. They can be isolated and identified by reversed phase C-18 HPLC and LC/Electrospray MS as Kaempferol glucoside, Kaempferol rutinoside, Quercetin glucoside, and Quercetin rutinosides (I. McMurrough and J. A. Delcour, supra; J. E. A. Van Gheluwe, et al., supra, A. Forster, et al., supra; I. McMurrough, supra, 1981). After treating the extract with PVPP (polyvinylpolypyrrolidone), we found that most polyphenols were removed (as analyzed by reversed phase C-18 HPLC and ultraviolet detector). However, the PVPP treated extract (without the polyphenols) still contributed significantly to the kettle hop flavor in the fermentation product. Thus, the removed polyphenols are not responsible for kettle hop flavor, which is similar to that reported by McMurrough (I. McMurrough and J. A. Delcour, supra; J. E. A. Van Gheluwe, et al., supra, A. Forster, et al., supra; I. McMurrough, supra, 1981). As such, we have unexpectedly discovered that there are still other unknown glycosides in the aqueous alcohol extract which remain undetectable using the above chemical methods. This can be due to low sensitivity of the instrument, low concentration of the analytes, lack of chromophores for sensitive UV detection and the absence of suitable standards.

Concentration/Purification/Identification of Glycosides

Figure 1:
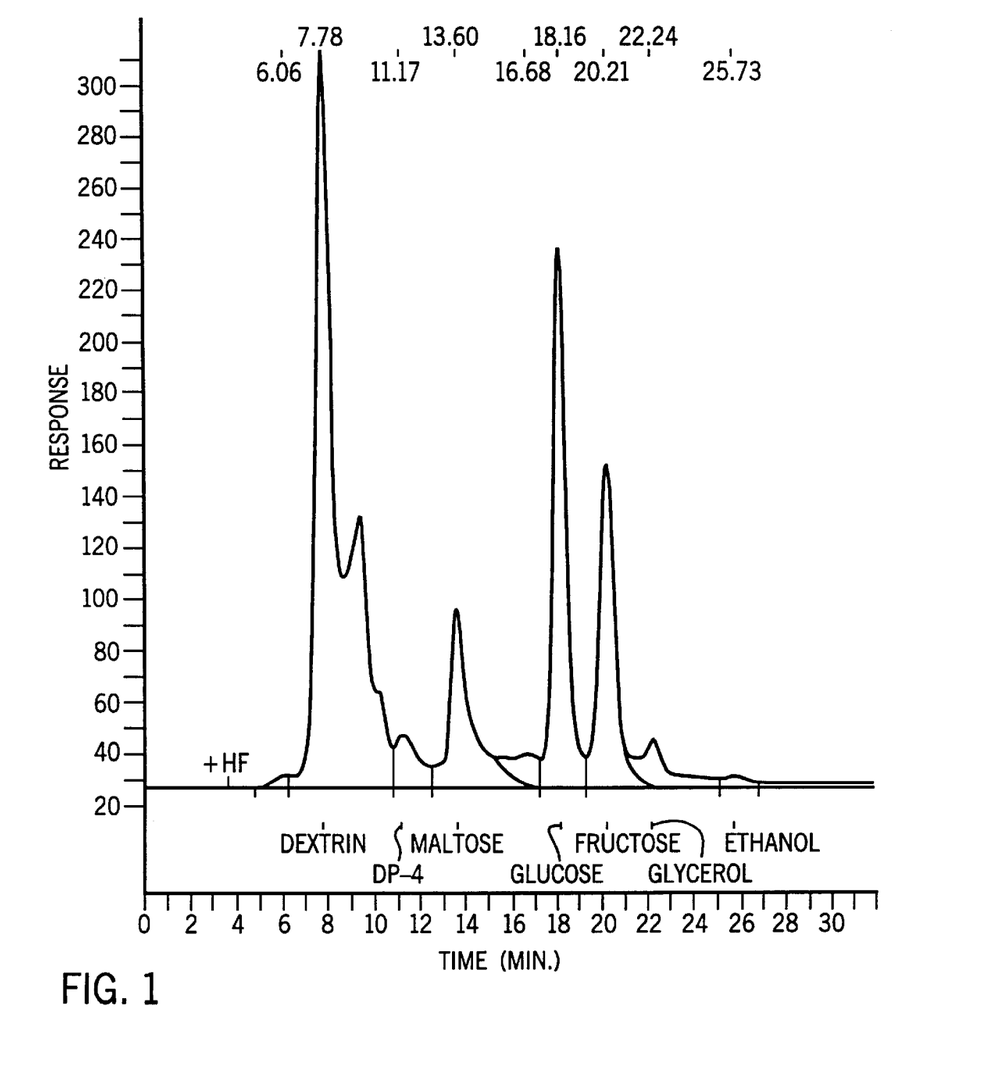
FIG. 1 is an HPLC profile of the non-retained XAD-2 fraction (those compounds removed from the aqueous alcohol extract) for carbohydrate analysis using an RI detector.

To improve both sensorial and chemical analyses, the aqueous alcohol extract of hop solids was concentrated and partially purified by a preparative liquid column chromatography. A column packed with a polyvinyl resin or Amerlite XAD-2 (styrene-divinylbenzene) was used to concentrate/purify the extract. These resins are capable of retaining polar compounds from aqueous solutions while rejecting non-polar compounds such as free carbohydrates. Carbohydrate analysis indicated that the non-retained portion contained free glucose, fructose, maltose and dextrin (shown in FIG. 1).

In general, the concentration and purification of the aqueous extract of hop solids can be accomplished by using materials such as: (1) polymeric adsorbent materials such as Amberlite XAD series resin from Rohm & Haas (XAD-2, XAD-4, XAD-16, etc.); (2) derivatized silica gel with hydrocarbons (C-2, C-4, C-18, etc.); (3) activated carbon; and (4) cellulose, as well as membrane processes such as reverse osmosis, ultrafiltration, size exclusion, etc. Using a combination of an aqueous alcohol extraction and one of the above methods, the concentration of the polar, water soluble kettle hop essences and flavorants, and precursors thereof, present in hops or hop solids can be increased 10 to 50 times as compared to that of using no treatment. It should be understood that the above purification methods are capable of removing at least a portion of the free carbohydrates and inorganic salts from the aqueous alcohol extract of hops (or hop solids).

Figure 2:
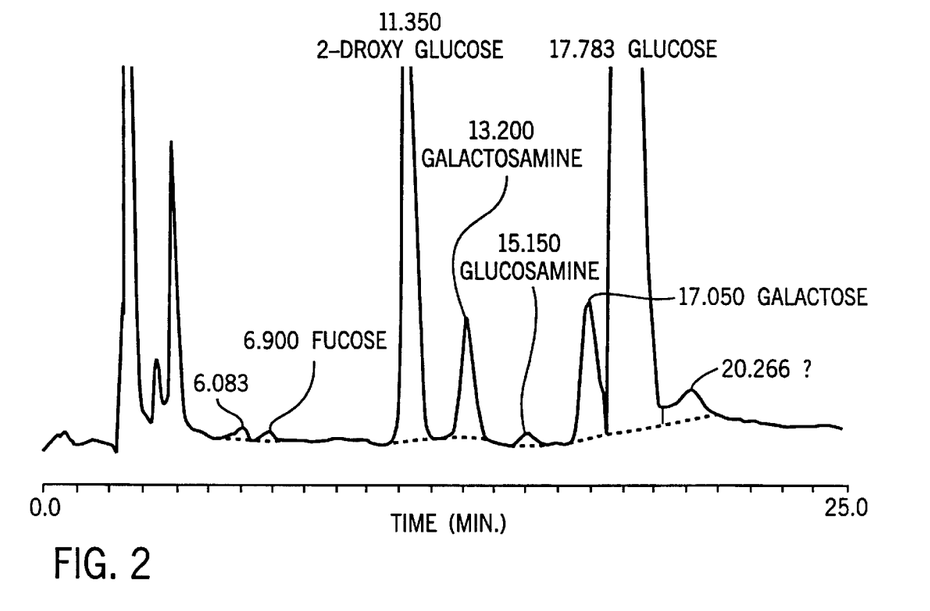
FIG. 2 is an HPLC profile of hydrolyzed XAD-2 fraction for carbohydrate composition analysis using an EC detector.

The polar compounds retained on the column were then eluted by alcohol and the eluent was concentrated by evaporation to yield a concentrate designated as XAD-2 fraction. A carbohydrate composition analysis of a completely hydrolyzed XAD-2 fraction was performed employing an ion-exchange HPLC with a sensitive pulse amperometric detector—an electrochemical (EC) detector (FIG. 2). The major carbohydrate composition of the completely hydrolyzed XAD-2 fraction was found to be glucose and minor components as galactose, fucose, glucosamine, and galactosamine. Thus, we have surprisingly discovered that the XAD-2 fraction consists of glycosides.

Due to the non-volatile character (multiple OH groups) of glycosides, a reversed phase C-18 LC/Electrospray MS technique was used for the direct analysis of glycosides in the XAD-2 fraction. Several compounds have been tentatively identified as glycosides by their molecular weights (Table 1).

TABLE 1

LC/Electrospray MS Results of Possible Glycosides in the XAD-2 Fraction

| Glycosides (m/z) | Aglycones | m/z |
| --- | --- | --- |
| 236 | 2-methyl-1-propanol | 74 |
| 264 | 1-hexanol | 102 |
| 270 | benzyl alcohol | 108 |
| 284 | phenyl ethanol | 122 |
| 316 | linalool | 154 |
| 318 | citronellol | 156 |
| 326 | raspberry ketone | 164 |
| 328 | acetovanillone | 166 |
| 332 | 2,6-dimethyl-2,7-octadien-1,6-diol | 170 |
| 358 | loliolide | 196 |
| 368 | 3-hydroxy-7,8-dehydro-$\beta$-ionone | 206 |
| 448 | linalool | 154 |
| 462 | linalool | 154 |

Figure 3:
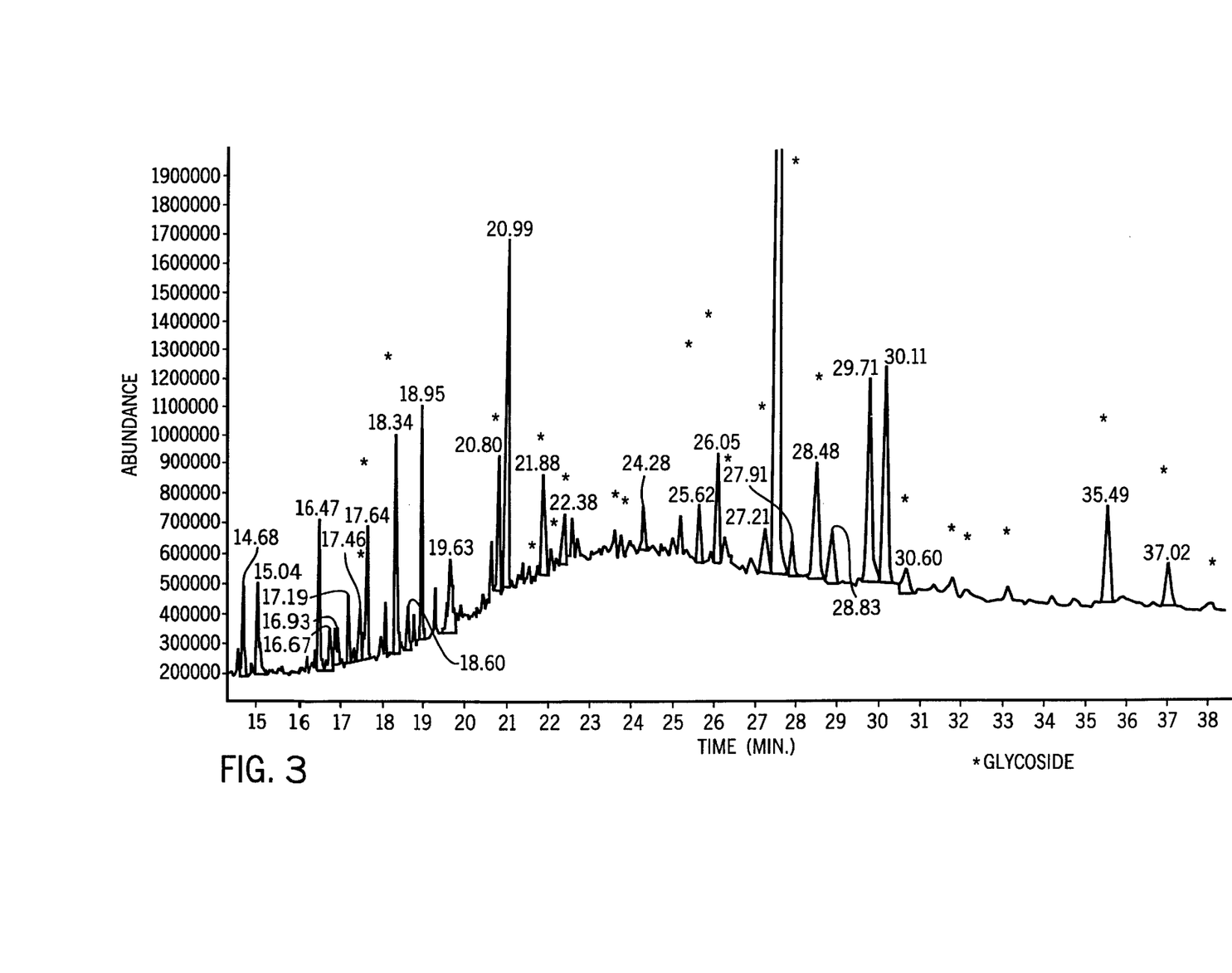
FIG. 3 is a GC/MS profile of TMS-derivatives of XAD-2 fraction.

In an analytical sense, the OH groups on the glucose molecule provide a way to increase its volatility by converting the OH groups into trimethylsilyl (TMS) or trifluoroacetyl (TFA) derivatives making them suitable for GC/MS analysis. A typical GC/MS analysis of the TMS derivatized XAD-2 fraction is shown in FIG. 3 in which peaks marked with asterisks are interpreted as glycosidically bound compounds based on their characteristic sugar fragments (Table 2) as compared with few commercially available standards and data from available literature (M. Martinelli, *European Journal of Mass Spectrometry in Biochemical, Medicine and*

*Environmental Research* 1(1):33–43, 1980; S. G. Voirin, et al., *Journal of Chromatography* 595:269–281, 1992; S. G. Voirin, et al., *Journal of Chromatography* 590:313–328, 1992).

TABLE 2

EI-Mass Spectrometry of TMS-Derivatized Glycosides

| Glycosides | Fragmentation of Sugar moiety (m/z) |
|---|---|
| β-D-glucopyranosides | 451, 361, 331, 319, 305, 271, 263, 243, 217, 204, 191, 169, 147, 129, 117, 103 |
| diglycopyranosides | 451, 378, 361, 331, 319, 273, 245, 243, 217, 204, 191, 109 |
| 6-o-(α-L-rhamnopyranosyl)-β-d-glucopyranosides | 363, 378, 361, 333, 319, 305, 273, 245, 243, 204, 217, 191, 130 |
| 6-9-(α-L-arabinofuranosyl)-β-d-glucopyranosides | 378, 361, 349, 331, 259, 217, 204, 109, 101 |

The above data confirm our unexpected discovery that multiple glycosides are present in the XAD-2 fractions. An advanced GC/MS instrumentation with a combination of electron ionization and positive/negative ion chemical ionization techniques was then used for further characterization. Some interesting and important glycosidically bound compounds (both glucosides and arabinoglucosides) were identified (Table 3) while many other peaks were not. The results surprisingly confirmed that the aglycones of these glycosides (loliolide, 2,6-dimethyl-2,7-octadien-1,6-diol, grasshopper ketone, citronellol, linalool, α-terpineol, and geraniol) are kettle hop taste and aroma compounds found in beer.

TABLE 3

Total GC/MS Results of TMS and TFA Derivatized Glycosides in the XAD-2 Fraction

| Glycosides | Aglycones | m/z |
|---|---|---|
| methyl butyl glycoside | methyl butanol | 88 |
| hexenyl glycoside | hexenol | 100 |
| octyl glycoside | octanol | 130 |
| benzyl glucoside | benzyl alcohol | 108 |
| phenyl ethyl glycoside | phenyl ethanol | 122 |
| loliolide glycoside | loliolide | 196 |
| 2,6-dimethyl-2,7-octadien-1,6-diol glycoside | 2,6-dimethyl-2,7-octadien-1,6-diol | 170 |
| grasshopper ketone glycoside | grasshopper ketone | 224 |
| citronellol glycoside | citonellol | 156 |
| linalool/geraniol/α-terpineol/glycoside | linalool/geraniol/α-terpineol | 154 |

Surprisingly, these results confirm that glycosides exist in hops and are responsible for kettle hop flavor.

In addition to the Amberlite XAD-2 (polyvinyl resin), activated carbon, reversed phase silica gels (C-18, C-2, NH2), Sephadex, and Cellulose can also be used to concentrate and fractionate the aqueous alcohol extract of hop solids.

As these glycosides have proved very difficult to analyze directly, we reasoned that a procedure involving enzymatic hydrolysis would allow us to analyze the freed volatile components of glycosides indirectly.

1) Enzymatic Reactions

Enzymatic reaction is very specific. For example, a specific group of glycosides with a β-glucose configuration can be enzymatically hydrolyzed to free the aglycones and glucose only by the enzyme β-glucosidase. Several yeast enzyme preparations (crushed yeast, whole yeast cell, yeast extract) as well as α- and β-glucosidase glucosidase and α- and β-galactosidase were used to treat the XAD-2 fraction. To avoid interference, the XAD-2 fraction prepared from Cascade hop solids was extracted with diethyl ether to remove any free volatiles prior to the enzyme reaction. The aqueous phase (XAD-2) was then treated with enzyme in a buffer solution at pH 6.0 (a pH 3.7 was also used) and 37° C. for three days. The resulting buffer solution was extracted and analyzed by GC/MS for volatile molecules (aglycones). When this aqueous phase was treated under the same conditions, but with no enzyme present, the above volatiles were not produced. Overall, β-glucosidase was found to be the most efficient enzyme to generate the greatest amount of volatile compounds.

It should be understood that any enzyme preparation can be used to hydrolyze the glycosidic precursors of aglycones as long as the enzyme preparation can break the attachment of the sugar moiety to the aglycone. One skilled in the art will recognize that the enzyme preparation must include enzymes capable of hydrolyzing the sugar moiety itself when the sugar moiety includes oligosaccharides (di, tri, etc.) as well as enzymes which break the attachment of the sugar moiety to the aglycone.

As expected with the presence of the glycosides in the XAD-2 fraction, many alcohols, diols, and organic acids were formed as the major products resulting from cleavages by β-glucosidase of the $C_1$—O—R bonds (β-glycosidic linkage to an aglycone and a glucose). Further rearrangement may result in the formation of aldehydes and ketones (P. Winterhalter, "Chapter 9—Oxygenated C-13-Norisoprenoids—Important Flavor Precursors", *Flavor Precursors, ACS Symposium,* 1992 American Chemical Society). Surprisingly, most volatile compounds (dominated by various alcohols, aldehydes, ketones, and organic acids) found were similar to those hop aroma constituents identified in fully hopped beers reported by Tressl, et al. (R. Tressl, et al., *J. Agric. Food Chem.* 26(6):1422–1425, 1978; L. Narziβ, et al., *Monatsschrift fur Brauwissenschaft* 38(8):324–330, 1985; P. Winterhalter, supra, 1992), except for some esters, terpenoids and sesquiterpenoids. Because esterification generally requires fermentation the absence of esters is not surprising. However, the organic acid precursors of esters were found.

Unimportant flavor components such as terpenes, sesquiterpenes and their oxidized products (which are originated from a hop oil fraction) (G. Seeleitner, et al., *Monatsschrift fur Brauwissenschaft* 38(9):367–371, 1985; L. Narziβ, et al., *Monatsschrift fur Brauwissenschaft* 38(11):448–454, 1985) were missing. This is understandable because we were using hop solids. As previously noted, these terpenes and sesquiterpenes are usually attributed to dry hopping aroma, but not the kettle hop flavor (J. Irwin, supra, 1988; U. Fukuoka and M. Kowaka, supra, 1983; J. G. Guzinski, supra, 1898; L. Narziβ, et al., supra, 1985; X. Yang, et al., supra, 1993). Unexpectedly, many kettle hop flavor compounds like linalool, α-terpineol, geraniol, 4-terpineol, loliolide, raspberry ketone, grasshopper ketone, ipsdienol, 2-methyl-6-methylene-3,7-octadien-2-ol, 2,6-dimethyl-2,7-octadien-1,6-diol, and β-damascenone (which was only detected in a pH 3.7 buffer) were found in these enzyme treated samples. Observation of these "indicator" compounds surprisingly proves that naturally odorless and non-volatile precursors (glycosides) exist and the formation of aglycones from glycosides is the likely mechanism for kettle hop flavor in brewing. This also explains the existence of some of their corresponding glycosides as identified by TMS GC/MS and LC/Electrospray MS described above.

Because it is known that conventional hopping with different hop varieties produces beers with different flavors, another hop variety, (an XAD-2 fraction of German Tettnanger hop solids) was also treated with β-glucosidase and analyzed for comparison. The chemical compositions of Cascade and German Tettnanger of XAD-2 fractions were somewhat different. Comparison of aglycones or glycosides of different varieties of hops employing either a direct analysis of glycosides or indirect analysis of aglycones from β-glucosidase hydrolysis provides a unique and novel method of differentiation between different hop varieties. These fingerprints of aglycones and glycosides may provide us with more hereditary information than using the hop oil patterns.

2) Yeast Treatment

During the course of our experimentation, we also surprisingly discovered that by incubating the XAD-2 fraction with yeast with no sugars, volatile compounds which are attributed to kettle hop flavor were formed. Using whole yeast has the advantage of utilizing all the inherent glucosidases or enzymes such as α-amylase, (1→4)-α-D-glucanglucohydrolase, inulinase, oligo-(1→6)-D-glucosidase, α-D-glucosidase, β-D-glucosidase, α-D-galactosidase, β-D-galactosidase, β-D-fructofuranosidase, and α-α-trehalase for broader substrate specificities (A. Barnett, "The Utilization of Disaccharides and Some Other Sugars by Yeast", *Advances in Carbohydrate Chemistry and Biochemistry*, 39:347–404, 1981, Academic Press, Inc.). Of course the easy availability of yeast is another reason.

Chemical analysis indicates that many alcohols (especially ethanol), diols, organic acids, and other hop compounds (α-terpineol, linalool, 2-methyl-6-methylene-3,7-octadien-2-ol, and 2,6-dimethyl-2,7-octadien-1,6-diol) produced by the yeast treatment above are similar to those produced by β-glucosidase treatment. Extra esters and cis- and trans-linalool oxide were also found. It indicates that glycosides present in the XAD-2 fraction have been metabolized by yeast which probably results in glycolysis and a secondary esterification. These results again surprisingly prove that glycosides containing glucose are indeed present in the XAD-2 fraction.

Identification of 1,6-anhydro-β-D-glycopyranose can be considered as additional evidence of a non-volatile sugar counterpart of glycosides.

3) Fermentation

The conditions for fermentation of the XAD-2 fraction are slightly different from that for beer fermentation. A model wort consisting of a buffer solution containing one of the following vital nutrients, sugar, dextrose, liquid adjunct, or corn syrup and various inorganic salts was used rather than real wort because of its flavor complexity. Sugars keep the yeast more viable and enhance its biological activity, i.e. increase the formation of kettle hop flavor.

Yeast during fermentation performs multiple functions including enzyme hydrolysis of glycosides (to aglycones including organic acids) and glycolysis of glucose (to ethanol and $CO_2$). A secondary esterification reaction between organic acids and alcohol probably result in various esters. Fermentation under aerobic conditions seems to be favored and the fermentation temperature was found not to be especially critical (10–30° C.). As a result, this model wort fermentation can provide a concentrate with direct, pure, and unambiguous kettle hop flavor described as grapefruit, citrus, pineapple, grassy, spicy, and estery notes, and unique pleasant taste and mouthfeel. The flavor profile of this concentrate was different from a control fermented without the XAD-2 fraction which produced a product perceived as having winey, sulfidic, yeasty with some estery notes. Their chemical constituents analyzed by GC/MS demonstrate that both yeast treated and fermented samples are comparable, and which are different from the enzyme treated sample in the formation of ethanol and esters.

4) Acid Hydrolysis

Non-enzymatic hydrolysis using diluted acid and heat is not selective and the resulting aglycones (volatile compounds) undergo further decomposition or rearrangement to produce many new and undefined flavoring compounds. Acid hydrolysis of the XAD-2 fraction was carried out in a pH 3.0 buffer solution at 40–60° C. for 12 hours along with an non-buffered aqueous XAD-2 solution (as a control). A SPME (solid phase micro extraction)/Headspace/GC/MS analysis of the products indicated that in addition to the presence of the hop compounds discussed above (such as linalool, nerol, and β-damascenone), many other uncharacteristic hydrocarbons were present probably due to secondary dehydration, rearrangement, and decomposition of the resulting aglycones by acid/heat hydrolysis. However, the non-buffered control sample was also found to contain many of these decomposed compounds in much lower quantities.

Under controlled acid hydrolysis (37° C. and pH 3.0 for 2–3 days), the ether extract produced was analyzed by GC/MSD. There were no significant secondary reaction products of hydrocarbons, but the hop compounds found (such as linalool, α-terpineol, 2-methyl-6-methylene-3,7-octadien-2-ol, and β-damascenone) quantitatively far exceeded those normally found after biological transformation. Finding 1,6-anhydro-β-D-glycopyranose in the resulting extract proves that acid hydrolysis of glycosides indeed occurred.

As shown above, many hop flavor compounds are bound to sugar molecules as glycosides and can be released (or not released) depending on the conditions used for the treatment.

Preparation of Post-Fermentation Hop Flavor Essences and Flavorants

We have thus far surprisingly shown the presence of hop flavor precursors (glycosides) in hops. Their aromatic potentials are revealed either by biological conversions (enzyme reaction, microbial metabolism, and fermentation) or by chemical reactions (acid and heat). This result is very important, since it provides valuable clues in the development of true kettle hop flavor essences and flavorants for addition to unhopped beer streams.

Two processes can be used to prepare the kettle hop flavor essences and flavorants using enzyme, yeast, or fermentation conversion of the extract. A batch process (static) and a continuous process (dynamic) employing immobilized enzymes or yeast are possible. The latter process may be especially economical. Also, under suitable conditions the use of acid hydrolysis and/or heat can also be employed.

Three different varieties of liquid $CO_2$ extracted hops (Galena, German Tettnanger, and Cascade) were used as the feed materials and their essences were prepared using a batch process. The procedures used are as follows:

1). The XAD-2 fraction was incubated with β-glucosidase in a model wort buffer (no sugars) for 3 days at 37° C.
2). The XAD-2 fraction was incubated with yeast in a model wort buffer (with no sugar) for 7 days at 15° C.
3). The XAD-2 fraction was fermented with yeast in a model wort (with sugars) for 7 days at 15° C.

After filtration, three hop flavoring liquids (containing essences and flavorants) were obtained. A "cocktail" was then made by mixing unhopped beer and these essences. To an unhopped beer was added each essence at the ratios of 20:1 to 6:1 (beer:essence) (v/v) respectively, and allowed to equilibrate in the refrigerator over night. A sensorial evaluation was conducted by a group of five panelists with surprising and unexpected results.

All panelists indicated that unhopped beers spiked with essences at ratios of 20:1 to 10:1 contributed the most kettle hop flavor. The fermented essence and flavorants contributed the best kettle hop flavor in beer. Both enzyme and yeast treated essences and flavorants also imparted significant kettle hop flavors as compared to the unhopped control.

The kettle hop flavors perceived (smell and taste) were described as hoppy, fruity, grapefruit, pineapple, citrus, lychee, peach, grassy, spicy, berry notes, and bitter. More notably, the kettle hop taste and flavor perceived was completely different than the taste and flavor contributed by terpenes and sesquiterpenes from hops or a hop oil fraction.

Another prototype essence or flavorant (which includes these terpene and/or sesquiterpene flavors) can be created by dosing the above essences with hop oils (steamed distilled) or a hop oil fraction before or after the treatments. This different hop flavor prototype of post-fermentation essence and flavorant is suitable for making products with heavy hop flavor, late hopping or dry hopping character.

In addition, the virgin (no enzyme or yeast treatment) XAD-2 fraction (intact glycosides) added in unhopped beer did not contribute much aroma, but produced the kettle hop flavor taste in the beer. This indicates that the intact glycosides are an unexpectedly important component of kettle hop flavor.

Figure 4:
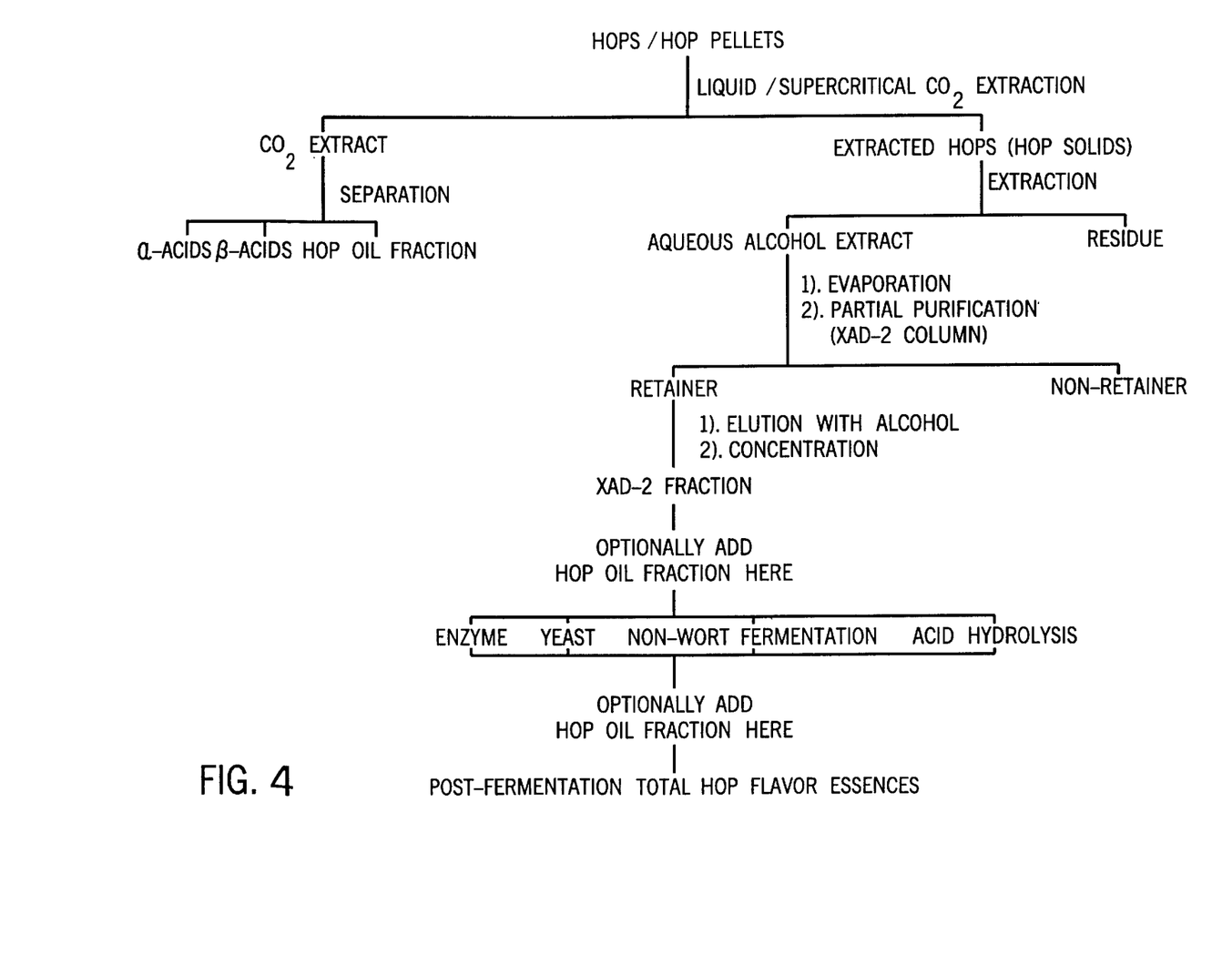
FIG. 4 is a flow diagram illustrating the methods of preparing kettle hop flavor essences of the present invention.

FIG. 4 shows a flow diagram illustrating the methods and kettle hop flavor essences of the present invention.

Conclusion

1. We have surprisingly confirmed that multiple glycosides exist in hops as well as in hop solids (which have been extracted with liquid/supercritical $CO_2$ or organic solvents). These glycosides are water soluble and can be concentrated/purified (by removing free carbohydrates and inorganic salts) using various polymeric materials such as silica gels, activated carbon, cellulose, etc. or by membrane processes.

2. We have surprisingly confirmed that these hop glycosides are themselves important kettle hop flavors and/or are precursors for kettle hop flavor. Real hop flavor and aroma (kettle hop flavor) of beer is developed by biological conversions of these hop glycosides into free aglycones or aromatic counterparts of glycosides. In addition, the intact glycosides also contribute the kettle hop flavor taste.

3. We have surprisingly found that kettle hop flavor not only can be smelled, but also can be tasted partly due to a continuing hydrolysis of glycosides. It is likely that the native or unhydrolized glycosides of hops are broken down in the mouth producing the kettle hop flavor and taste (T. Fujita, et al., *Phytochemistry* 31:3265–3267, 1992). Our unexpected finding suggests the secret of traditional aging process, "Krausening or Secondary Fermentation", which may be just a continuing hydrolysis of glycosides leading to an increase of flavor and aroma.

4. We have developed a prototype of post-fermentation kettle hop flavor essences and flavorants and another prototype of post-fermentation total hop flavor essences and flavorants. Each can be added directly into unhopped beer to impart either kettle hop flavor or total hop flavor similar to those products using whole hops or hop pellets. These essences and flavorants are also light stable and are suitable for products packaged in clear and green bottles.

5. Varying mixtures of intact glycosides and free aglycones in different proportion may also prove advantageous for producing beer with varying amounts and kinds of flavor, taste, and aroma.

6. We have succeeded in preparing the kettle hop flavor essences and flavorants by treating an aqueous alcohol extract (or a concentrated/partially purified extract) of hop solids (or even hops) with either enzyme, yeast or fermentation. These essences and flavorants can be dosed with hop oils or a hop oil fraction to create a total hop flavor essence and flavorant. Different types of essences and flavorants can be prepared by using specific varieties of hops.

7. We have found two processes that can be used for the preparation of kettle hop essences and flavorants: a batch process and a continuing process (using a fixed bed or immobilized enzyme or yeast). The latter process may be more economical.

8. Dosing unhopped beer with post-fermentation kettle hop flavor essences and flavorants, or total hop flavor essences and flavorants has the advantages of being economical, efficient, consistent, flexible, and convenient, and also improves quality.

9. The chromatographic fingerprints of glycosides or aglycones (by enzyme hydrolysis) can be used in differentiating varieties of hops.

10. We surmise that the most important outcome of the availability of the post-fermentation hop flavor essences and flavorants is the possible implementation of an innovative and improved streamlined brewing process. In practice, only an unhopped wort is needed to produce a stock of unhopped beer (premium or light, for example). The pre-made hop essence and flavorant and a bittering agent are injected into the unhopped beer stream to provide a kettle hop flavor and bitterness. Different brands of products can be produced in a manner which is similar to the making of "cocktails" by injecting an essence and flavorant or a mixture of essences and flavorants derived from specific varieties of hops. The economic impact can be tremendous. An increase in capacity and flexibility results from a decrease in the number of tanks and other brewing equipment needed for brewing, fermentation and aging.

11. The hop solids are by-products of liquid/supercritical $CO_2$ extraction of hops.

Experimental Section

1. Extraction

One kg of hop solids (hops which were extracted with liquid $CO_2$) was agitated and boiled with 5–6 liters of water for 4 hours, or agitated with 80% methanol/water at room temperature for 2 hours. The mixture was filtered and the filtrate was concentrated by rotary evaporator to about 1 liter. If the filtrate was cloudy, an additional clarification procedure using centrifugation was employed. This water extract was then used to prepare a flavor essence and flavorant by fermentation.

2. Concentration/Partial Purification

A 45×4 cm column packed with Amerlite XAD-2 was used for partial purification and concentration of the active compounds in the aqueous extract. One liter of extract was passed through the column and the effluent was collected. The column was then rinsed with 1–2 liters of distilled water and then eluted with 500 mL of methanol. The column was regenerated and the above procedure was repeated twice using the collected effluent. The combined methanol solutions were concentrated by rotary evaporator to give 500 mL of brown color extract. To remove some unwanted polyphenols, the extract was agitated with 16 g of PVPP for 1 hour. A final extract (500 mL) was obtained after filtration and designated as the XAD-2 fraction. For chemical and sensory analyses, the XAD-2 fraction was pre-extracted with diethyl ether (3×50 mL) to remove free volatiles to avoid interference.

3. Preparation of Essence by Enzyme

One hundred mL of XAD-2 fraction was dissolved in 100 mL of a buffer solution (either a potassium phosphate solution at pH 6.0 or a model wort buffer) and 1 g of β-glucosidase was added. The buffer was incubated at 37° C. for three days and then filtered to give a final preparation of essence.

4. Preparation of Essence by Yeast

One hundred mL of XAD-2 fraction was dissolved in 100 mL of a solution (containing $KH_2PO_4$, $CaSO_4$, $MgCl_2$, NaCl, $NH_4SO_4$) in a Erlenmeyer flask. To this solution was added 21 g of washed yeast. The mixture was incubated at 15° C. for 7 days. The yeast was removed by filtration to give a final preparation of essence. Prolonged incubation seemed to have a negative effect since sulfidic/sulfitic aromas were produced.

5. Preparation of Essence by Fermentation

One hundred mL of XAD-2 fraction was dissolved in a 100 mL model wort (with 48 g of liquid adjunct) in a 500 mL Erlenmeyer flask. To this was added 21 g of washed yeast. The mixture was allowed to ferment at 15° C. for 7 days. Removal of yeast yielded the final preparation of essence.

We claim:

1. A method of making a purified kettle hop flavorant, comprising:

extracting hop solids with an aqueous alcohol to produce an extract containing polar, water soluble compounds;

concentrating the extract with respect to the polar, water soluble compounds; and purifying the concentrated extract with respect to kettle hop flavorants to produce the purified kettle hop flavorant; wherein the flavorant produces a light stable beverage when used to prepare the beverage.

2. The method of claim 1, wherein the ratio of hops to aqueous alcohol is 1:1 to 1:100 w/v.

3. The method of claim 1, wherein the aqueous alcohol contains 20% to 80% v/v alcohol.

4. The method of claim 1, wherein the alcohol is ethanol.

5. The method of claim 1, wherein the concentrating step is accomplished by evaporation.

6. The method of claim 1, wherein the purifying step is accomplished by the steps of (a) feeding the extract to a liquid chromatography column having a packing material selected from the group consisting of polymeric resins, activated carbon, molecular sieves, silica gels, derivatized silica gels, celluloses, and derivatized celluloses whereby kettle hop flavorants are retained on the packing material; (b) eluting the kettle hop flavorants from the packing material to obtain an eluent containing the compounds; and (c) further concentrating the compounds in the eluent by evaporation.

7. The method of claim 6, wherein the kettle hop flavorants are glycosides.

8. A method of claim 7, comprising the further step of converting at least some of the glycosides to aglycones by breaking the attachment of the sugar moiety to the aglycone to provide a kettle hop essence.

9. The method of claim 7, comprising the further step of adding at least one hop fraction selected from the group consisting of hop oil, iso-α-acids, dihydroiso-α-acids, tetrahydroiso-α-acids, and hexahydroiso-α-acids to the purified kettle hop flavorant.

10. The method of claim 8, comprising the further step of adding at least one hop fraction selected from the group consisting of hop oil, iso-α-acids, dihydroiso-α-acids, tetrahydroiso-α-acids, and hexahydroiso-α-acids to the purified kettle hop essence and flavorant.

11. The method of claim 8, wherein the converting step is accomplished by fermentation in the presence of yeast and model wort.

12. The method of claim 8, wherein the converting step is accomplished by fermentation in the presence of yeast and wort.

13. The method of claim 1, wherein the purifying step is accomplished by the steps of (a) feeding the extract to a membrane process selected from the group consisting of filtration, reverse osmosis, ultrafiltration, size-exclusion, dialysis, electro-dialysis, and osmosis whereby the kettle hop flavorants are retained in a retentate and (b) further concentrating the compounds in the retentate by evaporation.

14. The method of claim 13, wherein the kettle hop flavorants are glycosides.

15. The method of claim 14, comprising the further step of converting at least some of the glycosides to aglycones by breaking the attachment of the sugar moiety to the aglycone to provide a kettle hop essence.

16. The method of claim 14, comprising the further step of adding at least one hop fraction selected from the group consisting of hop oil, iso-α-acids, dihydroiso-α-acids, tetrahydroiso-α-acids, and hexahydroiso-α-acids to the purified kettle hop flavorant.

17. The method of claim 15, comprising the further step of adding at least one hop fraction selected from the group consisting of hop oil, iso-α-acids, dihydroiso-α-acids, tetrahydroiso-α-acids, and hexahydroiso-α-acids to the purified kettle hop essence and flavorant.

18. The method of claim 15, wherein the converting step is accomplished by fermentation in the presence of yeast and model wort.

19. The method of claim 15, wherein the converting step is accomplished by fermentation in the presence of yeast and wort.

20. A method of making a purified kettle hop flavorant comprising:

extracting hop solids with an aqueous alcohol to produce an extract containing polar, water soluble compounds;

concentrating the extract with respect to the polar, water soluble compounds; and purifying the concentrated extract by removing at least a portion of free carbohydrates and inorganic salts to produce the purified kettle hop flavorant; wherein the flavorant produces a light stable beverage when used to prepare the beverage.

21. The method of claim 20, wherein the ratio of hops to aqueous alcohol is 1:1 to 1:100 w/v.

22. The method of claim 20, wherein the aqueous alcohol contains 20% to 80% v/v alcohol.

23. The method of claim 20, wherein the alcohol is ethanol.

24. The method of claim 20, wherein the concentrating step is accomplished by evaporation.

25. The method of claim 20, wherein the purifying step is accomplished by the steps of (a) feeding the extract to a liquid chromatography column having a packing material selected from the group consisting of polymeric resins, activated carbon, molecular sieves, silica gels, derivatized silica gels, celluloses, and derivatized celluloses whereby the free carbohydrates and inorganic salts in the extract are not retained by the packing material and kettle hop flavorants are retained on the packing material; (b) eluting the kettle hop flavorants from the packing material to obtain an eluent containing the retained compounds; and (c) further concentrating the retained compounds in the eluent by evaporation.

26. The method of claim 25, wherein the kettle hop flavorants are glycosides.

27. The method of claim 26, comprising the further step of converting at least some of the glycosides to aglycones by breaking the attachment of the sugar moiety to the aglycone to provide a kettle hop essence.

28. The method of claim 26, comprising the further step of adding at least one hop fraction selected from the group consisting of hop oil, iso-α-acids, dihydroiso-α-acids, tetrahydroiso-α-acids, and hexahydroiso-α-acids to the purified kettle hop flavorant.

29. The method of claim 27, comprising the further step of adding at least one hop fraction selected from the group consisting of hop oil, iso-α-acids, dihydroiso-α-acids, tetrahydroiso-α-acids, and hexahydroiso-α-acids to the purified kettle hop essence and flavorant.

30. The method of claim 27, wherein the converting step is accomplished by fermentation in the presence of yeast and model wort.

31. The method of claim 27, wherein the converting step is accomplished by fermentation in the presence of yeast and wort.

32. The method of claim 20, wherein the purifying step is accomplished by the steps of (a) feeding the extract to a membrane process selected from the group consisting of filtration, reverse osmosis, ultrafiltration, size-exclusion, dialysis, electro-dialysis, and osmosis whereby the free carbohydrates and inorganic salts are removed in the permeate and kettle hop flavorants are retained in the retentate (b) further concentrating the compounds in the retentate by evaporation.

33. The method of claim 32, wherein the kettle hop flavorants are glycosides.

34. The method of claim 33, comprising the further step of converting at least some of the glycosides to aglycones by breaking the attachment of the sugar moiety to the aglycones to provide a kettle hop essence.

35. The method of claim 33, comprising the further step of adding at least one hop fraction selected from the group consisting of hop oil, iso-α-acids, dihydroiso-α-acids, tetrahydroiso-α-acids, and hexahydroiso-α-acids to the purified kettle hop flavorant.

36. The method of claim 34, comprising the further step of adding at least one hop fraction selected from the group consisting of hop oil, iso-α-acids, dihydroiso-α-acids, tetrahydroiso-α-acids, and hexahydroiso-α-acids to the purified kettle hop essence and flavorant.

37. The method of claim 34, wherein the converting step is accomplished by fermentation in the presence of yeast and model wort.

38. The method of claim 34, wherein the converting step is accomplished by fermentation in the presence of yeast and wort.

39. The method of claim 8, wherein the converting step is accomplished in the presence of enzymes which are selected for their ability to break the attachment of the sugar moiety to the aglycone.

40. The method of claim 8, wherein the converting step is accomplished by acid hydrolysis.

41. The method of claim 15, wherein the converting step is accomplished in the presence of enzymes which are selected for their ability to break the attachment of the sugar moiety to the aglycone.

42. The method of claim 15, wherein the converting step is accomplished by acid hydrolysis.

43. The method of claim 27, wherein the converting step is accomplished in the presence of enzymes which are selected for their ability to break the attachment of the sugar moiety to the aglycone.

44. The method of claim 27, wherein the converting step is accomplished by acid hydrolysis.

45. The method of claim 34, wherein the converting step is accomplished in the presence of enzymes which are selected for their ability to break the attachment of the sugar moiety to the aglycone.

46. The method of claim 34, wherein the converting step is accomplished by acid hydrolysis.

* * * * *